(12) United States Patent
Tanaka et al.

(10) Patent No.: US 7,146,631 B1
(45) Date of Patent: Dec. 5, 2006

(54) CONTENT PROVIDING SYSTEM AND TERMINAL USED THEREIN

(75) Inventors: Tsutomu Tanaka, Nishinomiya (JP); Hiroki Murakami, Suita (JP); Takeshi Kokado, Kyotanabe (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 533 days.

(21) Appl. No.: 09/706,753

(22) Filed: Nov. 7, 2000

(30) Foreign Application Priority Data

Nov. 8, 1999 (JP) ................................ 11/316719

(51) Int. Cl.
    *H04N 7/173* (2006.01)
(52) U.S. Cl. .......................................... 725/112; 725/93
(58) Field of Classification Search ................ 725/112, 725/105, 93; 380/201, 239
    See application file for complete search history.

(56) References Cited

U.S. PATENT DOCUMENTS

| | | | | |
|---|---|---|---|---|
| 5,559,557 A | * | 9/1996 | Kato | 375/240.03 |
| 5,774,664 A | * | 6/1998 | Hidary et al. | 725/110 |
| 5,818,935 A | | 10/1998 | Maa | |
| 5,901,339 A | * | 5/1999 | Saito | 725/5 |
| 5,929,849 A | * | 7/1999 | Kikinis | 725/113 |
| 6,029,045 A | * | 2/2000 | Picco et al. | 725/34 |
| 6,173,317 B1 | * | 1/2001 | Chaddha et al. | 709/219 |
| 6,177,931 B1 | * | 1/2001 | Alexander et al. | 725/52 |
| 6,240,555 B1 | * | 5/2001 | Shoff et al. | 725/110 |
| 6,301,663 B1 | * | 10/2001 | Kato et al. | 713/176 |
| 6,308,202 B1 | * | 10/2001 | Cohn et al. | 709/217 |
| 6,493,872 B1 | * | 12/2002 | Rangan et al. | 725/32 |
| 6,571,392 B1 | * | 5/2003 | Zigmond et al. | 725/110 |
| 6,574,417 B1 | * | 6/2003 | Lin et al. | 386/70 |
| 6,735,569 B1 | * | 5/2004 | Wizig | 705/4 |

FOREIGN PATENT DOCUMENTS

| | | |
|---|---|---|
| JP | 7-154350 | 6/1995 |
| JP | 10-32802 | 2/1998 |
| JP | 10-164550 | 6/1998 |
| JP | 2000-196547 | 7/2000 |

\* cited by examiner

*Primary Examiner*—John Miller
*Assistant Examiner*—Hunter B. Lonsberry
(74) *Attorney, Agent, or Firm*—Wenderoth, Lind & Ponack, L.L.P.

(57) ABSTRACT

A system interrelating a program to be broadcast with a CM stored on a network 5 is implemented. The CMs (second contents) stored on the network 5 are each assigned a URL, while the program (first content) to be broadcast is embedded with tag information, which is used to specify the URL of the CM to be interrelated with the program for reproduction and output. Based on the tag information embedded in the received program, a TV commerce terminal 1 specifies any one URL and then fetches the CM having the URL assigned.

15 Claims, 12 Drawing Sheets

F I G. 1 0

| SPONSOR | AREA | URL |
|---|---|---|
| SPONSOR A | OSAKA | HOUSEHOLD ELECTRICAL APPLIANCE ftp://osaka.a.co.jp/ HOUSEHOLD ELECTRICAL APPLIANCEcm |
| | | AV ftp://osaka.a.co.jp/AVcm |
| | | ⋮ |
| | NAGOYA | HOUSEHOLD ELECTRICAL APPLIANCE ftp://nagoya.a.co.jp/ HOUSEHOLD ELECTRICAL APPLIANCEcm |
| | | AV ftp://nagoya.a.co.jp/AVcm |
| | | ⋮ |
| | TOKYO | HOUSEHOLD ELECTRICAL APPLIANCE ftp://tokyo.a.co.jp/ HOUSEHOLD ELECTRICAL APPLIANCEcm |
| | | AV ftp://tokyo.a.co.jp/AVcm |
| | | ⋮ |
| | ⋮ | ⋮ |
| SPONSOR B | OSAKA | ftp://oosaka.b.co.jp/cm |
| | NAGOYA | ftp://nagoya.b.co.jp/cm |
| | TOKYO | ftp://tokyo.b.co.jp/cm |
| | | ⋮ |
| ⋮ | ⋮ | ⋮ |

FIG. 11

NATIONAL TABLE

| SPONSOR | AREA | URL |
|---|---|---|
| SPONSOR A | OSAKA | HOUSEHOLD ELECTRICAL APPLIANCE ftp://osaka.a.co.jp/ HOUSEHOLD ELECTRICAL APPLIANCEcm |
| | | AV ftp://osaka.a.co.jp/AVcm |
| | | ⋮ |
| | NAGOYA | HOUSEHOLD ELECTRICAL APPLIANCE ftp://nagoya.a.co.jp/ HOUSEHOLD ELECTRICAL APPLIANCEcm |
| | | AV ftp://nagoya.a.co.jp/AVcm |
| | | ⋮ |
| | TOKYO | HOUSEHOLD ELECTRICAL APPLIANCE ftp://tokyo.a.co.jp/ HOUSEHOLD ELECTRICAL APPLIANCEcm |
| | | AV ftp://tokyo.a.co.jp/AVcm |
| | | |
| | ⋮ | ⋮ |
| SPONSOR B | OSAKA | ftp://oosaka.b.co.jp/cm |
| | NAGOYA | ftp://nagoya.b.co.jp/cm |
| | TOKYO | ftp://tokyo.b.co.jp/cm |
| | | ⋮ |
| ⋮ | ⋮ | ⋮ |

↓ BASED ON LOCATION INFORMATION, EXTRACTS ONLY INFORMATION RELEVANT TO THE AREA OF THE TERMINAL

REGIONAL TABLE

| SPONSOR | | URL |
|---|---|---|
| SPONSOR A | HOUSEHOLD ELECTRICAL APPLIANCE | ftp://oosaka.a.co.jp/ HOUSEHOLD ELECTRICAL APPLIANCEcm |
| | AV | ftp://oosaka.a.co.jp/AVcm |
| | ⋮ | ⋮ |
| SPONSOR B | | ftp://oosaka.b.co.jp/cm |
| ⋮ | | ⋮ |

| AREA | URL |
|------|-----|
| OSAKA | ftp://oosaka.b.co.jp/cm |
| NAGOYA | ftp://nagoya.b.co.jp/cm |
| TOKYO | ftp://tokyo.b.co.jp/cm |
| ⋮ | ⋮ |

FIG. 15

| ADVERTISEMENT PERIOD | SPONSOR |
|---|---|
| 2000.2.1~2000.3.1 | SPONSOR A |
| | SPONSOR D |
| | ⋮ |
| 2000.3.2~2000.12.31 | SPONSOR S |
| | SPONSOR H |
| | ⋮ |
| ⋮ | ⋮ |

FIG. 16

| USER'S WATCHING STATUS | SPONSOR |
|---|---|
| WATCHED REAL TIME | SPONSOR A |
| | SPONSOR D |
| | ⋮ |
| RECORDED FOR LATER | SPONSOR S |
| | SPONSOR H |
| | ⋮ |
| ⋮ | ⋮ |

CONTENT PROVIDING SYSTEM AND TERMINAL USED THEREIN

BACKGROUND OF THE INVENTION

1. Field of the Invention

The present invention relates to content providing systems and terminals used therein and, more specifically, to a content providing system interrelating a to-be-broadcast first content and a second content stored on a network, and a terminal used therein.

2. Description of the Background Art

On ground-wave nationwide television broadcasting, programs are distributed by a key station to local stations for broadcast.

If broadcast over commercial network, those programs are inserted with commercial messages (CMs). Such insertion of CMs are done by the key station if the CMs are nationally targeted, and by the local stations if regionally targeted.

Recently, a communications network including Internet network and optical fiber network has been aggressively built, and e-commerce thereon has become quite popular (hereinafter, such communications network is referred to as network). Stored on such networks are Web sites for merchandise advertisement and order reception, allowing users to do shopping from home.

On BS digital broadcasting to be started from December, 2000, programs are to be broadcast nationwide directly from the key station via a satellite digital broadcasting network. Therefore, if the network is a commercial network, the key station still can insert the CMs, whereas the local station cannot.

Here, those Web sites stored on the network are often regionally located. Also, there is a possibility of newly providing a storage for storing the regional CMs on the network.

Accordingly, considered herein is inserting such regional Web sites and CMs stored on the network to the programs broadcast via the satellite digital broadcasting network.

SUMMARY OF THE INVENTION

Therefore, an object of the present invention is to implement a system interrelating a program coming via a satellite digital broadcasting network and regional CMs stored on a network.

The present invention has the following features to attain the above-discussed object.

A first aspect of the present invention is directed to a terminal for receiving a first content to be broadcast and fetching a second content stored on a network, and interrelating the received first content and the fetched second content with each other for reproduction and output. The second content is plurally stored on the network. The second content is assigned a URL indicating where the second content is stored on the network. The first content is embedded with tag information used to specify the URL of the second content to interrelate the first and second contents with each other for reproduction and output. The terminal comprises: a reception part for receiving the first content; a fetch part for fetching the second content on the network; and a reproduction and output part for interrelating the first content received by the reception part and the second content fetched by the fetch part for reproduction and output. The fetch part refers to the tag information embedded in the first content received by the reception part to specify any one URL, and to fetch the second content having the assigned URL.

As described above, in the first aspect (or in the later-described thirteenth aspect), a second content is assigned a URL indicating where the second content is stored on a network, while a first content to be broadcast is embedded with tag information, which is used to specify the URL of the second content to be interrelated with the first content for reproduction and output. Based on the tag information, the terminal specifies the URL, and then fetches the second content having the assigned URL. Therefore, the second content can be the one to be interrelated with the received first content for reproduction and output. In this manner, a provider can interrelate a first content to be broadcast and a desired second content stored on the network with each other before providing those to a user.

According to a second aspect, in the first aspect, the first content is a program to be broadcast nationwide through a satellite broadcasting network, the second content is a regional CM, the tag information has a name or an identifier of a sponsor and/or a product. Additionally, the terminal further comprises: a location storage part for storing location information indicating in which area the terminal is. As for the CM stored on the network, the fetch part refers to a table indicating the URL, the sponsor and/or the product, and a targeting area, and specifies the URL of the CM matching with the name or identifier of the sponsor and/or the product in the tag information embedded in the program received by the reception part, and with the area of the terminal.

As described above, in the second aspect (or in the later-described fourteenth aspect), tag information has a name or an identifier of a sponsor and/or a product and the terminal stores location information indicating in which area the terminal is located. Once a program is received, the terminal refers to a table indicating, as for each CM stored on the network, the URL, the sponsor and/or the product, and a targeting area, and specifies the URL of the CM matching with the name or identifier of the sponsor and/or product in the tag information embedded in the program received by the reception part, and with the area of the terminal. In this manner, a provider can interrelate a program to be broadcast nationwide through a satellite broadcasting network with a regional CM of a desired sponsor and/or a product made specifically for the area where terminal is located (i.e., the area where a user of the terminal lives), and provide those to users all over the country.

According to a third aspect, in the second aspect, the terminal further comprises a table storage part for storing the table. The fetch part specifies, on its own, the URL by referring to the table stored in the table storage part.

As described above, in the third aspect (or in the later-described fifteenth aspect), the terminal itself stores the table, and carries out URL specification based thereon.

According to a fourth aspect, in the second aspect, the fetch part brings a name server, which has the table stored, to specify the URL by providing the tag information and the location information thereto.

As described above, in the fourth aspect (or in the later-described sixteenth aspect), the terminal brings a name server having the table stored to perform URL specification by providing the tag information and the location information thereto.

According to a fifth aspect, in the first aspect, the first content is scrambled, and the second content is embedded with key information used to descramble the first content. Further, the reproduction and output part extracts the key information from the second content fetched by the fetch part, descrambles the first content by the key information, and interrelates the first and second contents with each other for reproduction and output.

As described above, in the fifth aspect (or in the later-described twentieth aspect), the first content is scrambled, and the second content is embedded with key information used to descramble the first content. The terminal extracts the key information from the fetched second content, and descrambles the received first content thereby. In this manner, the terminal has to fetch the second content, otherwise the received first content cannot be reproduced or outputted.

Therefore, a provider can make the user watch the second content (typically a CM) with the first content (typically a program).

According to a sixth aspect, in the fifth aspect, the second content is in a form of MPEG2 video stream, the key information is embedded in a user data region located in a predetermined layer of the MPEG2 video stream, and the reproduction and output part extracts the key information from the user data region.

As described above, in the sixth aspect, the second content is in a form of MPEG2 video stream, and the key information is embedded in a user data region located in a predetermined layer (e.g., group-of-picture layer, picture layer, or sequence layer) of the MPEG2 video stream.

According to a seventh aspect, in the sixth aspect, the predetermined layer is a group-of-picture layer.

According to an eighth aspect, in the sixth aspect, the predetermined layer is a picture layer.

According to a ninth aspect, in the sixth aspect, the predetermined layer is a sequence layer.

According to a tenth aspect, in the fifth aspect, the second content is in a form of MPEG2 video stream, the key information is embedded in the MPEG2 video stream by digital watermark, and the reproduction and output part decodes the MPEG2 video stream, and extracts the key information therefrom.

As described above, in the tenth aspect, the second content is in the form of MPEG2 video stream, and the key information is embedded therein by digital watermark. In this case, the MPEG2 video stream has to be decoded, otherwise the key information cannot be extracted. Thus, the second content is assuredly watched by the user.

According to an eleventh aspect, in the first aspect, the second content is predetermined by a timing for output, and the fetch part prefetches the second content before the timing to allow the reproduction and output part to output the second content with the timing.

As described above, in the eleventh aspect, the second content is prefetched before the timing predetermined for output thereof.

According to a twelfth aspect, in the first aspect, the tag information has the URL of the second content to be interrelated with the first content for reproduction and output, and the fetch part fetches the second content having the URL found in the tag information assigned.

As described above, in the twelfth aspect (in the later-described twenty-first aspect), the tag information embedded in the received first content has the URL, and the terminal fetches the second content having the URL assigned.

A thirteenth aspect of the present invention is directed to a content providing system for interrelating a first content to be broadcast and a second content stored on a network. The system comprises: a broadcast device for broadcasting the first content; a storage which is provided on the network, and stores a plurality of the second contents; and a terminal for receiving the first content broadcast by the broadcast device and fetching the second content from the storage, and interrelating the received first content and the fetched second content with each other for reproduction and output. The second content is assigned a URL indicating where the second content is stored on the network. The broadcast device embeds, in the first content, tag information used to specify the URL of the second content to be interrelated with the first content with each other for reproduction and output. The terminal specifies any one URL based on the tag information embedded in the received first content, and fetches the second content having the URL assigned.

According to a fourteenth aspect, in the thirteenth aspect, the first content is a program to be broadcast nationwide through a satellite broadcasting network. The second content is a regional CM. The tag information has a name or an identifier of a sponsor and/or product. The terminal knows its own location, and refers to, as for the CM stored in the storage, a table indicating the URL, the sponsor and/or the product, and a targeting area, and specifies the URL of the CM matching with the name or identifier of the sponsor and/or product in the tag information embedded in the program received by the reception part, and with the area of the terminal.

According to a fifteenth aspect, in the fourteenth aspect, the terminal further stores the table, and specifies the URL on its own.

According to a sixteenth aspect, in the fourteenth aspect, the content providing system further comprises a name server having the table stored. The terminal brings the name server to specify the URL by providing the tag information and the location information thereto. Further, the name server specifies the URL, and responds the URL back to the terminal.

According to a seventeenth aspect, in the fifteenth aspect, the broadcast device further broadcasts the table, and the terminal receives and stores the table broadcast by the broadcast device.

As described above, in the seventeenth aspect, in addition to the program, the table is broadcast. The terminal then receives and stores the table.

According to an eighteenth aspect, in the fifteenth aspect, the broadcast device further broadcasts the table. Further, the terminal receives the table broadcast by the broadcast device, selects, from the received table, only information relevant to the area of the terminal based on the location information stored therein, and stores a newly-generated table including the selected information only.

As described above, in the eighteenth aspect, in addition to the program, the table is broadcast. The terminal then receives the table, selects only information relevant to the area of the terminal, and then stores the newly-generated table having only the selected information. Accordingly, the amount of information stored in the terminal is reduced.

According to a nineteenth aspect, in the thirteenth aspect, the second content is predetermined with a timing for output. Further, the broadcast device embeds the tag information in a temporal position in the first content where the terminal can fetch the second content before the timing.

As described above, in the nineteenth aspect, the second content is predetermined by a timing for output. The broadcast device embeds the tag information in a temporal position of the first content where the terminal can prefetch the second content before the timing. Therefore, the terminal can output the second content with the timing.

According to a twentieth aspect, in the thirteenth aspect, the first content is scrambled. The broadcast device gives, to the storage, key information used to descramble the first content before broadcasting the first content. The storage embeds the given key information in the second content stored therein. Further, the terminal extracts the key information from the second content fetched from the storage, descrambles the first content by the key information, and interrelates the first and second contents with each other for reproduction and output.

According to a twenty-first aspect, in the thirteenth aspect, the tag information has the URL of the second content to be interrelated with the first content to be broadcast by the broadcast device for reproduction and output. Further, the terminal fetches, from the storage, the second content corresponding to the URL.

These and other objects, features, aspects and advantages of the present invention will become more apparent from the following detailed description of the present invention when taken in conjunction with the accompanying drawings.

BRIEF DESCRIPTION OF THE DRAWINGS

FIG. 10 shows a specific example of URL table stored in a memory part 180 in FIG. 6;

FIG. 11 shows a national URL table (upper; identical to the table of FIG. 10), and a regional URL table (lower) which is generated based on the upper;

FIG. 15 shows an exemplary advertisement period table embedded in a program as tag information; and FIG. 16 shows an exemplary user's watching status table embedded in a program as tag information.

DESCRIPTION OF THE PREFERRED EMBODIMENTS

Hereinafter, an embodiment of the present invention is described by referring to accompanying drawings.

First Embodiment

Figure 1:
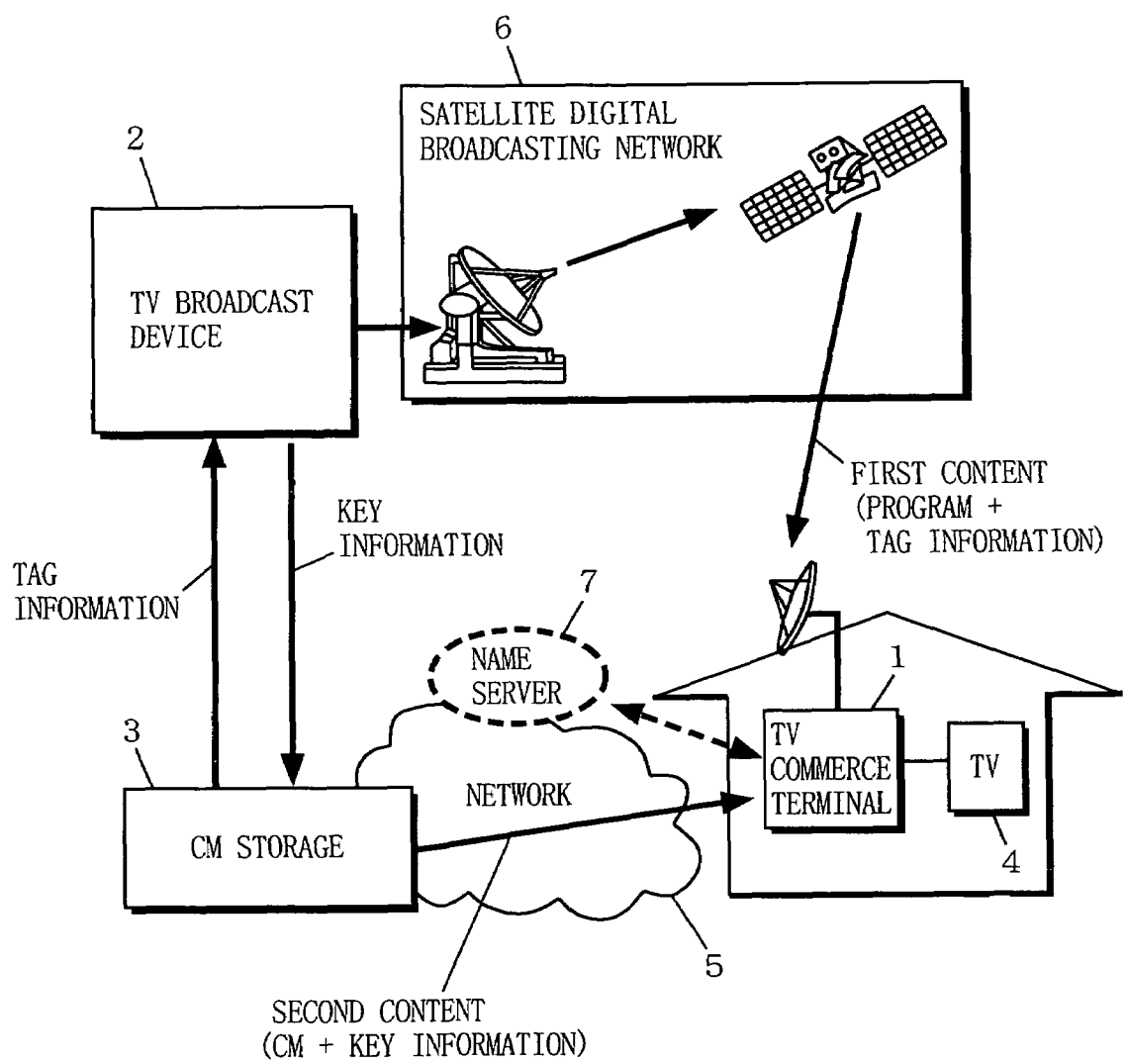
FIG. 1 is a block diagram showing the structure of a TV commerce system according to one embodiment of the present invention.

FIG. 1 is a block diagram showing the structure of a TV commerce system according to the embodiment of the present invention. In FIG. 1, the TV commerce system is structured by a TV commerce terminal 1, TV broadcast device 2, and CM storage 3.

The TV commerce terminal 1 is placed in a user's house who watches a digital TV program, and is connected to a TV 4. The CM storage 3 is placed in a local advertising agency, and connected to the user's TV commerce terminal 1 over a network 5 such as Internet network and optical fiber network. The TV broadcast device 2 is placed in a broadcasting station, from which digital TV programs are broadcast to users all over the country over a satellite digital broadcasting network 6. The satellite broadcasting network is the one using broadcast/communications satellites.

The TV broadcast device 2 is connected to the CM storage 3 placed in the regional advertising agency via the network 5 or a dedicated circuit.

Figure 2:
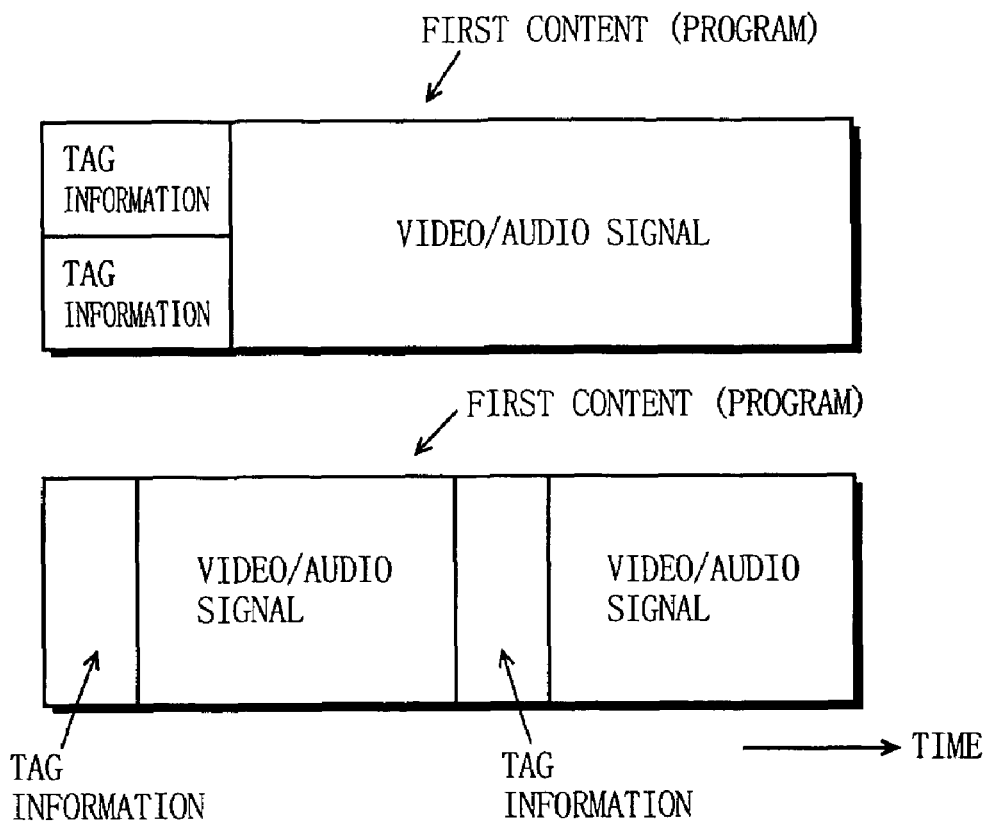
FIG. 2 is a bit map showing the structure of a first content (program) to be broadcast by a TV broadcast device 2 in FIG. 1.

FIG. 2 is a bit map showing the structure of a first content (program) to be broadcast by the TV broadcast device 2 of FIG. 1. In FIG. 2, the first content includes a video/audio signal and tag information of a program. The video/audio signal has been scrambled, and thus requires a descramble key to make the program available for the user.

Here, a plurality of CMs are presumed to be inserted in a one-hour program whenever predetermined. For example, when 12 CMs are ready for the program, 4 of them are inserted at the beginning of the program, another 4 after 20 minutes, and the rest after 40 minutes.

The tag information interrelates the first content and a second content (CM) with each other. Such information is typically a URL, which is an address of the CM to be inserted in the program. In this embodiment, for allowing each local station to insert regional CMs, the tag information is presumed to be;

(1) a code indicating a specific sponsor (hereinafter, "sponsor code"), and (2) a code indicating a specific product (hereinafter, "product code").

The tag information is embedded in the first content, specifically in a position where the CM can be reproduced on time, allowing for a time taken for the TV commerce terminal 1 to fetch, based thereon, the CM from the CM storage 3. To be specific, as is the upper first content in FIG. 2, the tag information may be wholly embedded in the vicinity of the head, or as is the lower, may be partially embedded in positions wherever possible to be available in time for CM outputs.

In the system of FIG. 1, such structured first content (video/audio signal and tag information) is transmitted from the TV broadcast device 2 to the TV commerce terminal 1 via the satellite digital broadcasting network 6 in the form of MPEG-TS (transport stream).

Figure 3:
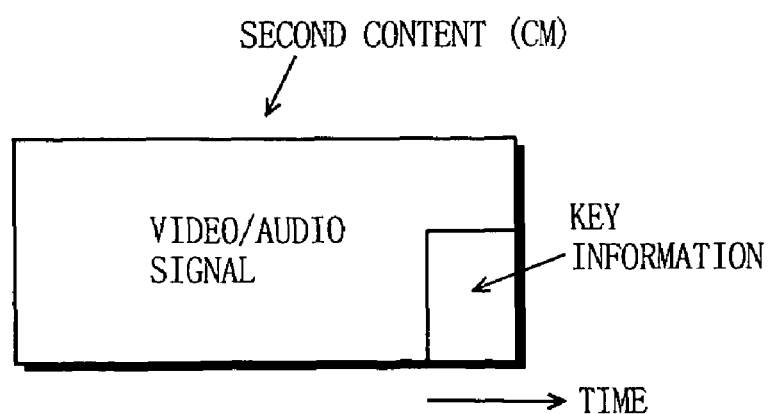
FIG. 3 is a bit map showing the structure of a second content (CM) to be stored in a CM storage 3 in FIG. 1.

FIG. 3 is a bit map showing the structure of the second content (CM) to be stored in the CM storage 3 of FIG. 1. In FIG. 3, the second content includes a video/audio signal and key information of a CM.

The key information is used to descramble the video/audio signal of the program included in the first content, and is preferably located at the tail of the second content, preventing the program from being reproduced before the CM's complete reproduction.

Figure 4:
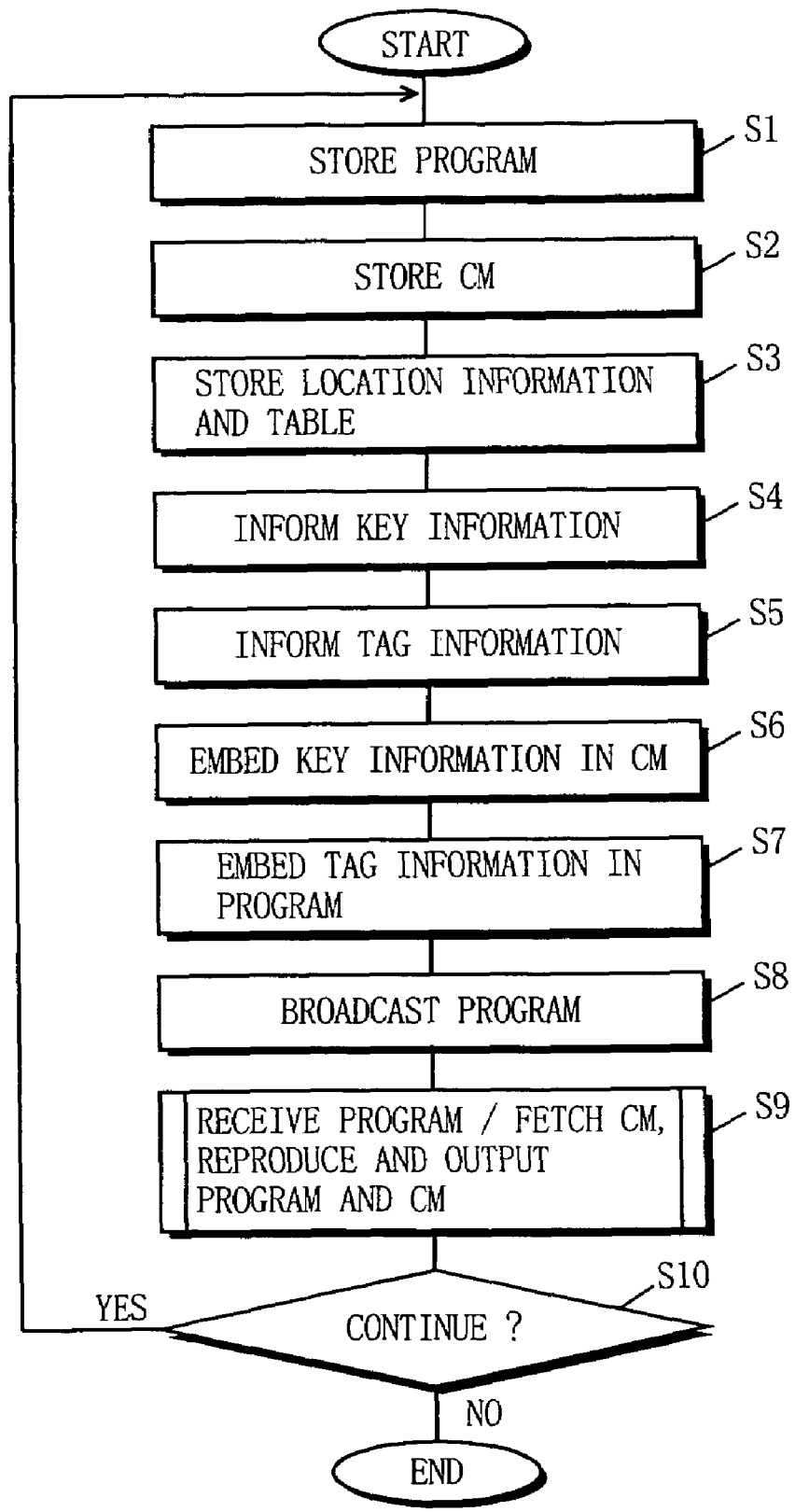
FIG. 4 is a flowchart showing, in brief, the comprehensive operation of the entire system in FIG. 1.

FIG. 4 is a flowchart showing, in brief, the comprehensive operation of the system of FIG. 1. With reference to FIG. 4, described below is the operation of the system of FIG. 1.

In FIG. 4, first of all, the TV broadcast device 2 placed in a TV broadcasting station stores a digital TV program as the first content (step S1).

The CM storage 3 placed in a regional advertising agency stores, as the second contents, several sponsors' product CMs (step S2).

As an example, the CM storage 3 placed in Osaka stores a sponsor A's CMs targeting Osaka area, made for products of "Aa", "Ab", "Ac", and the like. Then, to each of those, a URL address is assigned to indicate where the CM is located. For example, assigned to the CM of "Aa" product is "ftp://oosaka.A.co.jp/a".

The TV commerce terminal 1 stores location information which tells its own location, and a URL table indicating from where the second contents are to be each fetched (that is, URL address of each CM stored in step S2) (step S3).

Next, the TV broadcast device 2 provides, to the CM storage 3 (in each area), key information as for the first content stored in step S1 (step S4). On the other hand, provided from the CM storage 3 (in each area) to the TV broadcast device 2 is the tag information as for the second contents stored in step S2 (step S5).

The CM storage 3 (in each area) then embeds the key information given in step S4 to the second contents stored in step S2 (step S6). The TV broadcast device 2 embeds, on the other hand, the tag information given in step S5 in the first content stored in step S1 (step S7).

Accordingly, the first content (program) and the second content (CM) are interrelated with each other with the help of the tag information, location information, and URL table. Also, as the key information has been embedded in the CM, the TV commerce terminal 1 has to reproduce the CM first, otherwise no program becomes available.

Next, the TV broadcast device 2 broadcasts, via the satellite digital broadcasting network 6, the first content (video/audio signal and tag information; FIG. 2) to the TV commerce terminals 1 all over the country (step S8).

The TV commerce terminals 1 each receive the first content broadcast in step S8, extract the CMs stored in step S2, and reproduce the program and CMs for output to the TV 4 (step S9). Thereafter, the system determines whether to continue its operation (step S10). If determined Yes, the procedure returns to step S1 to repeat the same procedure as above. If No, the system terminates its operation.

Figure 5:
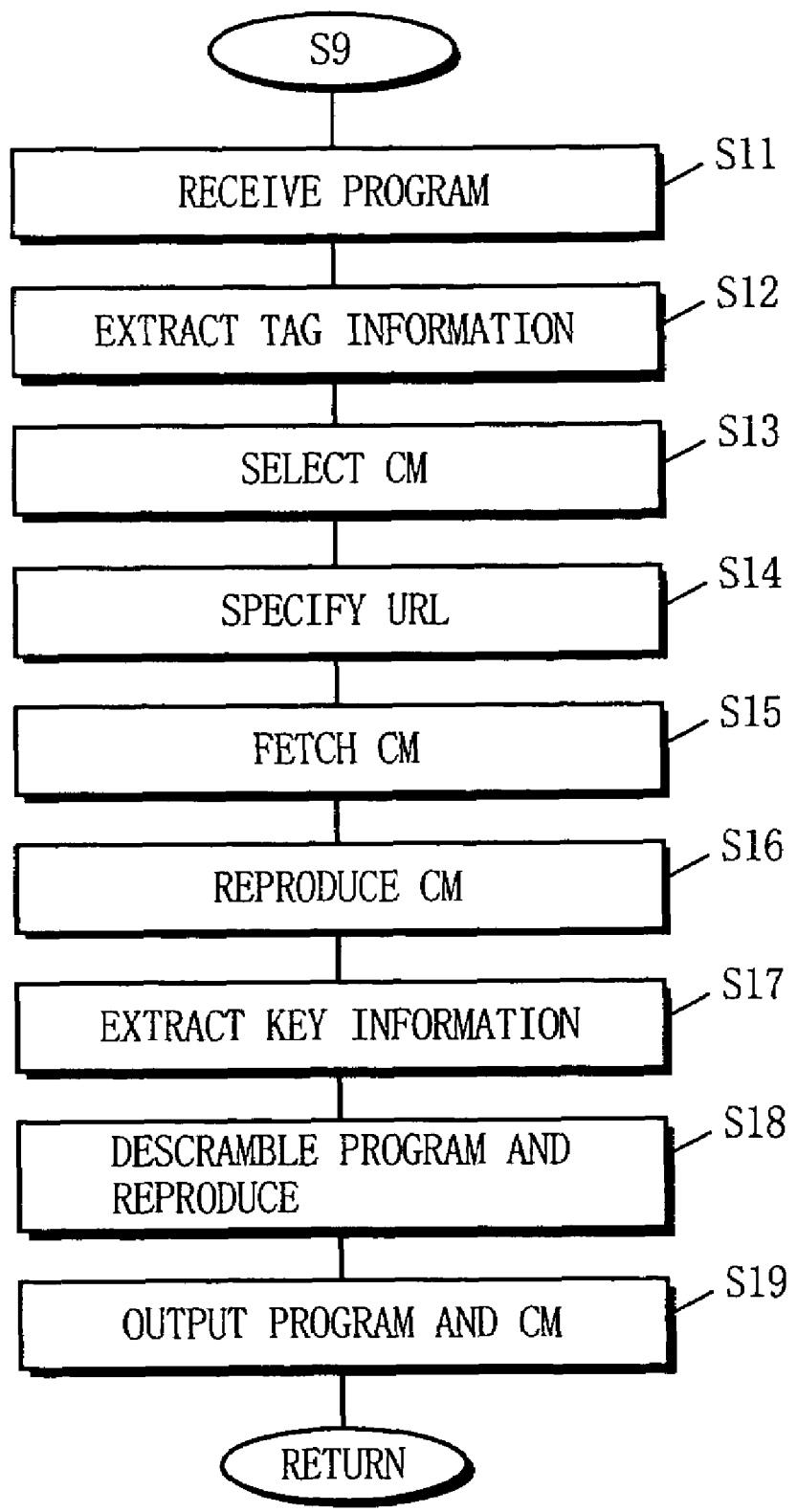
FIG. 5 is a flowchart showing, in brief, the operation (step S9 in FIG. 4) of a TV commerce terminal 1 in FIG. 1.

FIG. 5 is a flowchart showing, in brief, the operation (step S9 in FIG. 4) of the TV commerce terminal 1 in FIG. 1.

In FIG. 5, the TV commerce terminal 1 receives the first content via a satellite antenna (step S11), and then extracts the tag information therefrom (step S12). The TV commerce terminal 1 then selects a CM (to be inserted into the program for reproduction) according to the tag information extracted in step S12, and the location information stored in step S3 (step S13).

Here, in the CM selection processing in step S13, the tag information and the location information may or may not uniquely determine the CM. If it does determine the CM, the TV commerce terminal 1 then automatically selects the CM. If it does not determine the CM, the TV commerce terminal 1 displays some potential CMs and leave those for the user's selection.

The TV commerce terminal 1 refers to the location information and the URL table stored in step S3 to perform URL specification for the CM selected in step S13 (step S14), and then fetches the second content having the URL assigned from the CM storage 3 (step S15).

Then, the TV commerce terminal 1 reproduces the video/audio signal of the CM in the second content fetched in step S15 (step S16), and then extracts the key information from the second content (step S17). Thereafter, the TV commerce terminal 1 uses the key information extracted in step S17 to descramble, for reproduction, the video/audio signal of the program in the first content (step S18). The video/audio signals of the program and the CM reproduced in step S18 are then outputted to the TV 4 with a predetermined timing (step S19). Then, the TV commerce terminal 1 (the procedure returns to the flow in FIG. 4) goes through step S10.

In the above operation, "both the location information and the URL table are stored in the TV commerce terminal 1 (step S3)", and then "TV commerce terminal 1 itself selects the CM based thereon (step S13)". Alternatively, the system of FIG. 1 may be additionally provided with a name server 7 for storing the URL table, and thus the TV commerce terminal 1 may store only the location information.

If this is the case, the above step S3 is replaced with steps S3a and S3b as follows:

"the TV commerce terminal 1 stores the location information (step S3a), while the name server 7 stores the URL table (step S3b).

Also, the above step S13 is replaced with steps S13a and S13b as follows:

"the TV commerce terminal 1 gives the tag information and the location information to the name server 7, and brings the name server 7 to carry out URL specification (step S13a). In response, the name server 7 refers to such given information and the URL table stored therein for URL specification, and then gives the result obtained thereby back to the TV commerce terminal 1 (step S13b)."

Described next is a specific implementation of this system.

<Processing from Program Creation to Program Broadcast (Corresponding to Steps S1 to S8 in FIG. 4)>

In FIG. 1, a TV broadcasting station creates a first content, which is an entertainment TV program such as a drama and documentary. Here, this is not restrictive, and any independent firm (subcontractor) will do.

A local advertising agency looks for any sponsor who is willing to pay for the program (air time). If found, the agency negotiates with the TV broadcasting station (subcontractor) when the program is to be on the air, nationwide, via the satellite digital broadcasting network 6.

The advertising agency also creates a CM, a second content, for the sponsor.

Then, the TV broadcast device 2 in the TV broadcasting station and the CM storage 3 in the advertising agency exchange key information and tag information therebetween. The TV broadcast device 2 then embeds the tag information in the program, while the CM storage 3 embeds the key information in the CM. Here, the TV broadcasting station may receive a CM from the advertising agency and embed both information therein, or the advertising agency may receive a program from the TV broadcasting station and embed both information therein.

The tag information (TVRL; Television Resource Locator) is used to interrelate a program and a CM with each other. Specifically, Such TVRL includes, in addition to the above-described "sponsor" code and "product" code, a "manufacturer" code specifically indicating who produced the product. Here, the "code" is an identifier (ID) uniquely allocated for companies or products, and typically is the combination of character, symbol, number, and the like.

The TV broadcast device 2 subjects the program embedded with the tag information to scramble processing, to the extent that the tag information can be extracted from the scrambled program. Specifically, in the case that the program is transmitted in the form of MPEG-TS, the stream is sectionally assigned for transmission of tag information, and scramble processing is not executed to a transport packet including the section.

The key information embedded in the CM is used to descramble such scrambled program. When the CM is in the form of MPEG video stream, the key information is stored in a user data region located in a predetermined layer (e.g., group-of-picture layer, picture layer, or sequence layer) in the stream. Alternatively, the key information may be embedded in the MPEG2 video stream by digital watermark, and the MPEG decoding part 140 may decode the MPEG2 video stream so as to extract the key information therefrom.

The TV broadcast device 2 then converts the program into a radio wave so as to broadcast the program nationwide via the satellite digital broadcasting network 6 in the contracted air time. The broadcast radio wave is received by the user's TV commerce terminal 1 through the satellite antenna, and then converted into TV videos.

<Processing from Program Reception to TV Output (Corresponding to Step S9 in FIG. 4>

Figure 6:
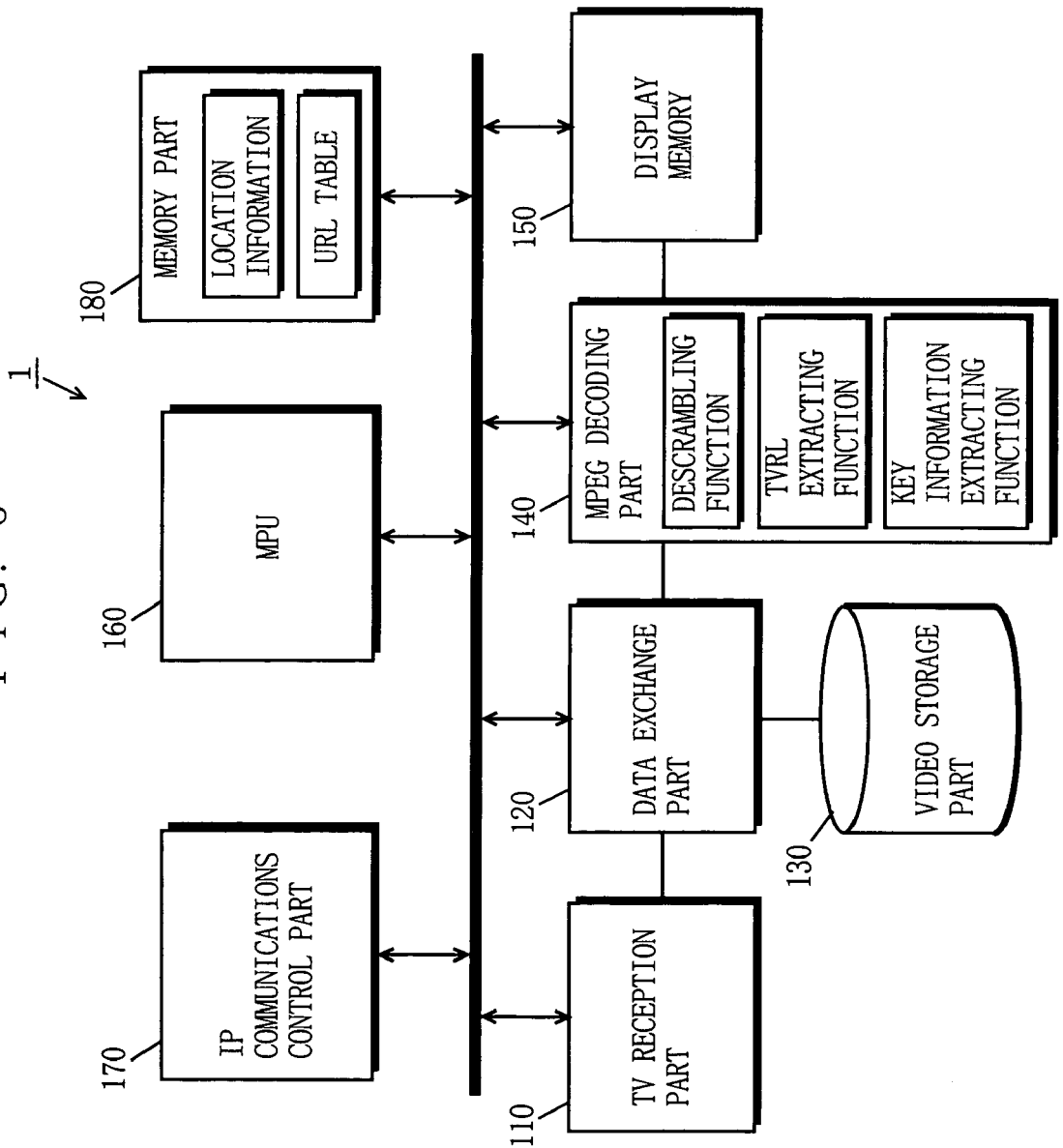
FIG. 6 is a block diagram showing the specific structure of the TV commerce terminal 1 in FIG. 1.

FIG. 6 is a block diagram showing the specific structure of the TV commerce terminal 1 of FIG. 1. In FIG. 6, the TV commerce terminal 1 includes a TV reception part 110, data exchange part 120, video storage part 130, MPEG decoding part 140, display memory 150, MPU 160, IP communications control part 170, and memory part 180.

The TV reception part 110 receives the radio wave from the TV broadcast device 2, and converts the radio wave into MPEG-TS (may be converted into MPEG-PS or MPEG-ES, but anyhow, does not affect the essence of the present invention). The MPEG-TS from the TV reception part 110 is forwarded to the video storage part 130 or the MPEG decoding part 140 via the data exchange part 120.

The video storage part 130 stores the MPEG-TS coming from the data exchange part 120. The MPEG-TS stored in the video storage part 130 is then forwarded to the MPEG decoding part 140 via the data exchange part 120. By forwarding the MPEG-TS via the video storage part 130, the program can be time-shifted for reproduction (i.e., store and then reproduce).

The IP communications control part 170 is connected to the CM storage 3 through the network 5. The memory part 180 previously stores location information and a URL table. The location information stored therein is the user's home address inputted by the user at his/her purchase of the TV commerce terminal 1 (through buttons on a remote controller, for example). The URL table is the one multiplexed on a program, and broadcast with the program from the TV broadcast station 2. The TV reception part 110 receives such URL table, and the memory part 180 stores the same.

The MPU 160 first selects a CM to be inserted into the program, for reproduction, according to the tag information, location information, and URL table. The MPU 160 then refers to the URL table to perform URL specification to the selected CM. Then, through the IP communications control part 170 and the network 5, the MPU 160 extracts the CM (MPEG video stream) applicable to the specified URL from the CM storage 3.

The MPEG decoding part 140 decodes the MPEG-TS coming from the data exchange part 120 and the MPEG video stream fetched by the MPU 160 so that the video/audio signals of the program and CM are reproduced.

The MPEG decoding part 140 is additionally provided with a descrambling function, TVRL extracting function, and key information extracting function. In other words, the MPEG decoding part 140 descrambles the MPEG-TS, extracts the tag information (TVRL) therefrom, and then extracts the key information from the MPEG video stream.

The display memory 150 stores the reproduced video/audio signals.

In the case that the system has been additionally provided with the name server 7, the memory part 180 stores only the location information. If this is the case, the MPU 160 provides the name server 7 with the tag information and the location information, and brings the name server 7 to select a CM to be inserted in the program, and performs URL specification to the selected CM. In response, the name server 7 operates as requested, and gives the result obtained thereby back to the MPU 160. The MPU 160 then fetches the applicable CM having the URL assigned from the CM storage 3.

At the time of CM selection, if the tag information, location information, and URL table do not uniquely determine a CM, the MPU 160 leaves the CM selection for the user. In such case, the user may tap his/her keyboard (not shown) to input his/her selection (or the MPU 160 may perform CM selection according to its discretion, or at random).

Figure 7:
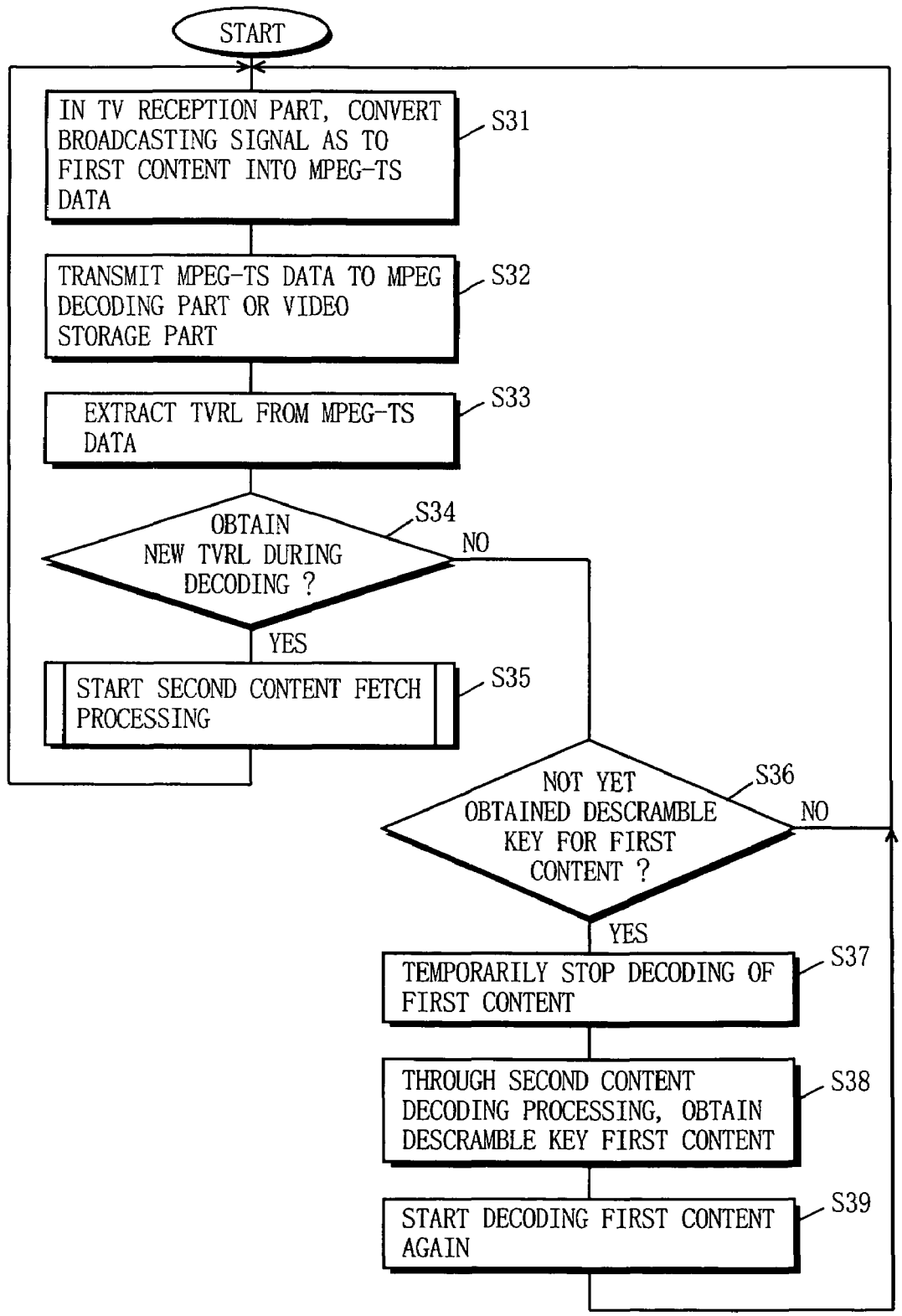
FIG. 7 is a flowchart showing the specific operation (processing procedure of an MPU 160 in FIG. 6) of the TV commerce terminal 1 in FIG. 1.

With reference to FIG. 7 for flowchart, described next is the operation of such structured TV commerce terminal 1.

FIG. 7 is a flowchart showing the specific operation (processing procedure of the MPU 160 in FIG. 6) of the TV commerce terminal 1 of FIG. 1. In FIG. 7, the MPU 160 first instructs the TV reception part 110 to convert a broadcasting signal into MPEG-TS (step S31), and then forwards the MPEG-TS to the MPEG decoding part 140 or the video storage part 130 via the data exchange part 120 (step S32).

The MPEG decoding part 140 sequentially decodes the MPEG-TS coming directly from the TV reception part 110 or via the video storage part 130. At this time, the MPU 160 instructs the MPEG decoding part 140 to extract the tag information from the MPEG-TS (step S33).

The MPU 160 then monitors the MPEG decoding part 140 to determine whether any new tag information has been extracted during the decoding (step S34). If determined Yes, the MPU 160 goes through the processing of fetching the second content (CM) (step S35). Then, the procedure returns to step S31 to repeat the same processing as above.

If determined No in step S35, the MPU 160 monitors the MPEG decoding part 140 to determine whether a key for descrambling the first content (MPEG-TS corresponding to the program) has been already obtained (step S36). If the determination is No, the procedure returns to step S31 to repeat the same processing as above.

If determined Yes in step S36, the MPU 160 instructs the MPEG decoding part 140 to temporarily stop the decode processing with respect to the first content (step S37), and then decodes the second content (MPEG video stream corresponding to the CM) so as to extract the key therefrom (step S38). Then, the MPU 160 brings the MPEG decoding part 140 to start again the decode processing (step S39). The procedure then returns to step S31, and repeats the same processing as above.

Figure 8:
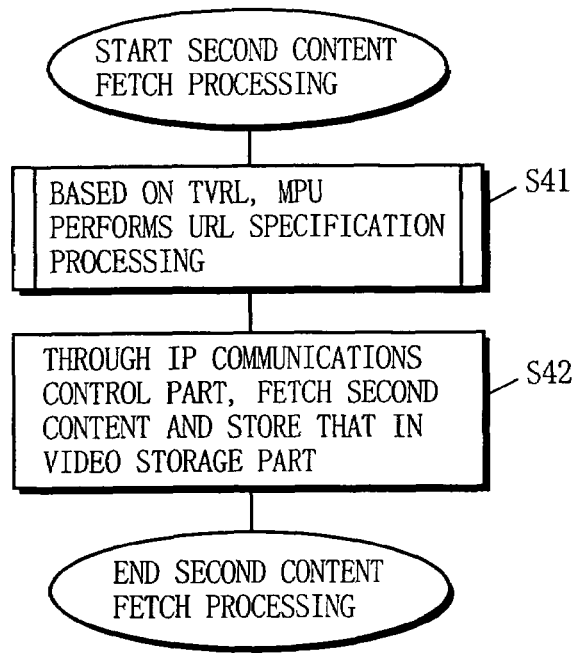
FIG. 8 is a flowchart showing, in detail, step S35 in FIG. 7, i.e., second content fetch processing carried out by the MPU 160 in FIG. 6.

FIG. 8 is a flowchart showing, in detail, step S35 in FIG. 35, i.e., the second content fetch processing carried out by the MPU 160 in FIG. 6. In FIG. 8, the MPU 160 first performs URL specification based on the TVRL extracted in step S33 in FIG. 7. That is, the MPU 160 perform URL specification to the CM to be inserted in the program for reproduction (step S41).

Next, the MPU 160 fetches, from the CM storage 3 via the IP communications control part 170, the second content having the URL specified in step S41 assigned, and stores the second content in the video storage part 130 (step S42). Then, the procedure returns to the flow in FIG. 8.

<Specific Example of URL Specification Processing>

Figure 9:
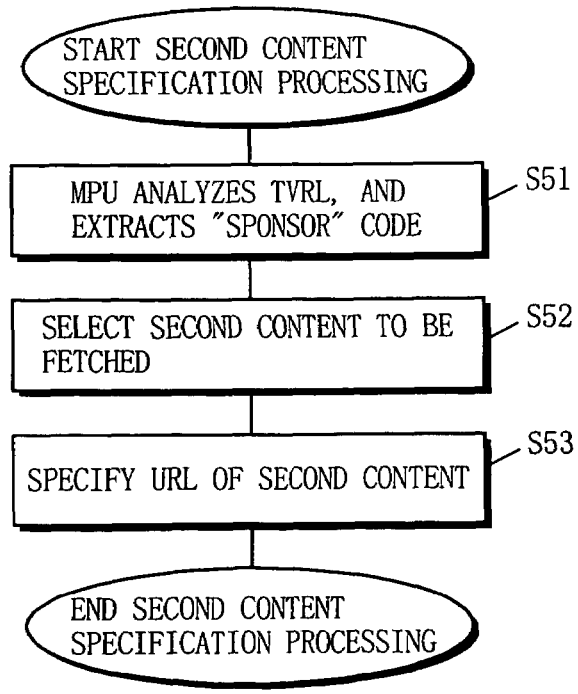
FIG. 9 is a flowchart showing step S41 in FIG. 8, i.e., exemplary URL specification processing (in the case that tag information has "sponsor" code, and the MPU 160 itself specifies URL) carried out by the MPU 160 in FIG. 6.

FIG. 9 is a flowchart showing step S41 in FIG. 8, i.e., exemplary URL specification processing (in the case that tag information has "sponsor" code, and the MPU 160 itself performs URL specification) carried out by the MPU 160 in FIG. 6.

In FIG. 9, the MPU 160 first analyzes the tag information (TVRL) extracted by the MPEG decoding part 140 from the first content, and extracts a "sponsor" code therefrom (step S51).

Next, the MPU 160 selects, according to the location information and the URL table stored in the memory part 180, and the "sponsor" code extracted from the tag information in step S51, the second content to be fetched, that is, a CM to be inserted in the program for reproduction (step S52).

Here, the selection processing in step S52 is specifically described.

FIG. 10 is a specific URL table stored in the memory part 180 in FIG. 6. The table of FIG. 10 carries sponsors of "A" and "B", and addresses (URL) of CMs regionally classified into "Osaka", "Nagoya", and "Tokyo". As is known from the table, the CMs of the sponsor "B" are regionally one each, but the sponsor "A" has plural CMs for each region (e.g., CMs of household electrical appliances such as refrigerators and washing machines, and AV equipment such as televisions and stereo sets).

Assuming that the location information stored in the memory part 180 indicates "Osaka", and the "sponsor" code extracted from the tag information indicates "B", the MPU 160 refers to, in step S52, the table of FIG. 10, and then selects the CM for Osaka of the sponsor "B".

As an another example, assuming that the location information stored in the memory part 180 indicates "Osaka", and the "sponsor" code extracted from the tag information indicates "A", the MPU 160 refers to, in step S52, the table of FIG. 10, and selects both CMs of the "household electrical appliances" and "AV equipment" for Osaka of the sponsor "A".

In the case that such selected plural CMs need to be singularly selected, the MPU 160 displays, for example, a screen on its display (not shown) for the user to select either CM of "household electrical appliance" or "AV equipment". Alternatively, the user may previously input his/her sex, age, hobby, and the like, to the TV commerce terminal 1 through a keyboard (not shown), for example, and the MPU 160 may perform CM selection based thereon.

Referring back to FIG. 9, the MPU 160 then performs URL specification by referring to the URL table stored in the memory part 180. That is, the MPU 160 specifies the address (URL) of the second content (CM) selected in step S52 (step S53). Thereafter, the procedure returns to the flow in FIG. 8.

Herein, the URL table stored in the memory part 180 is the one obtained from the TV broadcast device 2 by air. Or, the URL table may be previously stored in the memory part 180 at the shipment of the TV commerce terminal 1.

The memory part 180 in the TV commerce terminal 1 may store, instead of such national URL table as in FIG. 10, a regional URL table having only information relevant to the area where the TV commerce terminal 1 is placed.

In order to have the memory part 180 store the regional URL table, one manner is exemplarily described next. That is, the TV broadcast device 2 broadcasts the national URL table, which is then received by the TV commerce terminal 1. Then, as shown in FIG. 11, the TV commerce terminal 1 extracts, from the national URL table, only information relevant to the area where the TV commerce terminal 1 is placed. The regional URL table is thus generated.

Specifically, the MPU 160 extracts, from the national URL table received by the TV reception part 110, the information relevant to the area of the TV commerce terminal 1 based on the location information stored in the memory part 180. Thus generated is the regional URL table having only the extracted information, and then the table is stored in the memory part 180. Accordingly, the amount of information stored in the memory part 180 is reduced.

Figure 12:
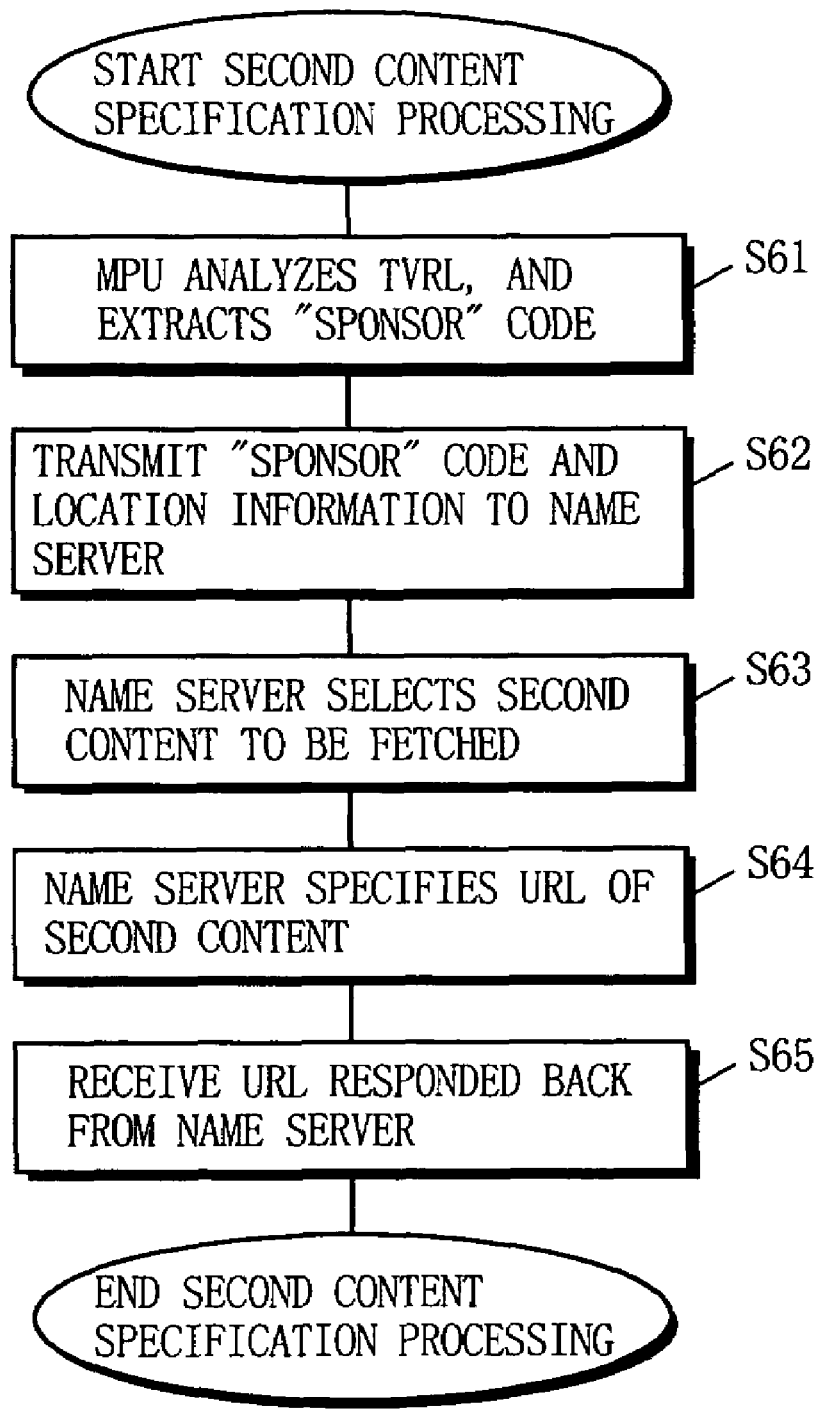
FIG. 12 is a flowchart showing step S41 in FIG. 8, i.e., another exemplary URL specification processing (in the case that tag information has "sponsor" code, and the MPU 160 asks a name server 7 for URL specification) carried out by the MPU 160 in FIG. 6.

FIG. 12 is a flowchart showing step S41 in FIG. 8, i.e., another exemplary URL specification processing (in the case that tag information has "sponsor" code, and the MPU 160 asks a name server 7 for URL specification) carried out by the MPU 160 in FIG. 6.

In FIG. 12, the MPU 160 first analyzes the tag information (TVRL) extracted from the first content, and then extracts the "sponsor" code therefrom (step S61).

Here, stored in the memory part 180 are the location information and the address of the name server 7 having the URL table stored (e.g., "osaka.name.com").

Next, the MPU 160 transmits, to the name server 7 via the IP communications control part 170, the "sponsor" code extracted in step S61 and the location information stored in the memory part 180 (step S62).

Since having the URL table stored, the name server 7 carries out, in place of the MPU 160, the above-described CM selection processing (step S52) and URL specification processing (step S53).

In detail, based on the location information and "sponsor" code given in step S62, and the stored URL table, the name server 7 selects a second content to be fetched, that is, a CM to be inserted in the program (step S63). The name server 7 then specifies the URL by referring to the URL table, that is, specifies the address (URL) of the second content (CM) selected in step S63 (step S64), and gives the result obtained thereby back to the TV commerce terminal 1.

Next, the MPU 160 receives the URL responded back from the name server 7 (step S65). The procedure then returns to the flow in FIG. 9.

Herein, if a plurality of CMs have been selected in step S64, and if there needs to be one selected therefrom, the name server 7 leave the CM selection for the user via the TV commerce terminal 1.

Figures 13, 14:
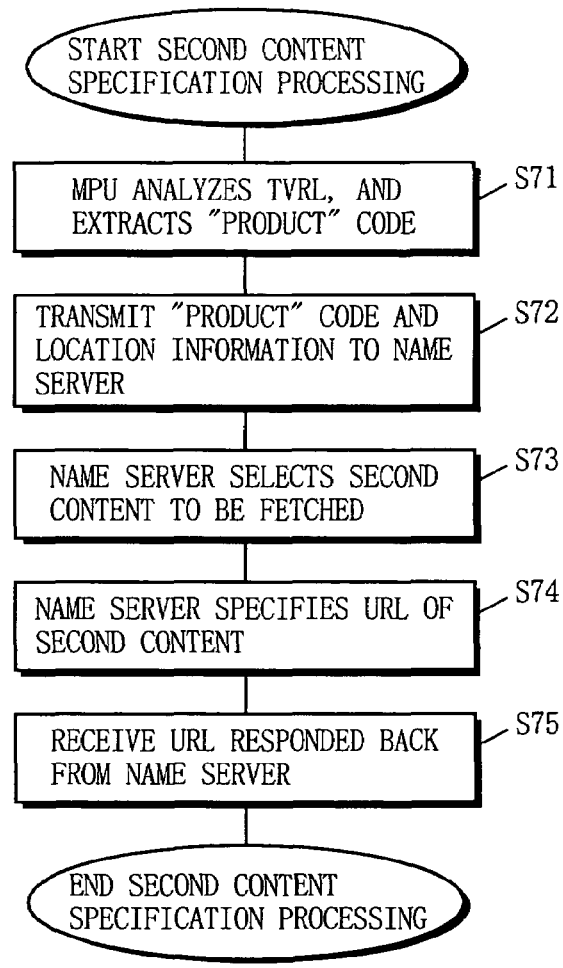
FIG. 13 is a flowchart showing step S41 in FIG. 8, i.e., still another exemplary URL specification processing (in the case that tag information has "product" code, and the MPU 160 asks the name server 7 for URL specification) carried out by the MPU 160 in FIG. 6.
FIG. 14 shows an exemplary URL table embedded in a program as tag information.

FIG. 13 is a flowchart showing step S41 in FIG. 8, i.e., still another exemplary URL specification processing (in the case that tag information has "product" code, and the MPU 160 asks the name server 7 for URL specification) carried out by the MPU 160 in FIG. 6.

In FIG. 13, the MPU 160 first analyzes the tag information (TVRL) extracted by the MPEG decoding part 140 from the first content, and then extracts the "product" code therefrom (step S71).

Here, stored in the memory part 180 are the location information and the address of the name server 7 having the URL table stored (e.g., "osaka.name.com").

The MPU 160 then transmits the "product" code extracted in step S71 and the location information stored in the memory part 180 to the name server 7 (addressed to its URL) via the IP communications control part 170 (step S72).

The name server 7 has the URL table stored, and selects a second content to be fetched, i.e., selects a CM to be inserted in the program (step S73). This selection is made based on the "product" code and the location information given in step S72, and the URL table stored in the name server 7.

The selection processing in step S73 is carried out next below, for example.

Assuming that the location information stored in the memory part 180 indicates "Osaka", and the "product" code informed by the MPU 160 is "sponsor A's household electrical appliances", the name server 7 refers to, in step S73, the table of FIG. 10, and then selects the CM for Osaka of the "sponsor A's household electrical appliances".

Referring back to FIG. 13, the name server 7 then specifies the URL by referring to the URL table, that is, specifies the URL of the second content (CM) selected in step S73 (step S74). The name server 7 then gives the result obtained thereby back to the TV commerce terminal 1.

The MPU 160 then receives the resultant URL transmitted by the name server 7 (step S75). The procedure then returns to the flow in FIG. 9.

As described above, in this embodiment, each second content stored on the network 5 (the CM storage 3 thereon) is assigned a URL, and a program (first content) to be broadcast (by the TV broadcast device 2 via the satellite digital broadcasting network 6) is embedded with tag information. The tag information is the one used for URL specification to a CM interrelated with the program for reproduction. Based on such tag information embedded in the received program, the TV commerce terminal 1 first specifies the URL, and then fetches a CM having the URL assigned. Therefore, the CM fetched (from the CM storage 3) in such manner can be appropriately interrelated with the program. Accordingly, the user can be provided with a program to be broadcast together with his/her desired CM stored on the network 5, which are interrelated with each other.

Noted herein is that, the tag information has a "sponsor" code or a "product" code, and the TV commerce terminal 1 stores the location information indicating where the terminal 1 is. Once the program is received, the TV commerce terminal 1 refers to a table indicating, as for each CM, the URL, the sponsor and/or the product, and a targeting area, and specifies the URL of the CM matching with the name or identifier of the sponsor and/or product in the tag information embedded in the program, and with the area of the terminal. In this manner, a program to be broadcast nationwide through a satellite broadcasting network can be interrelated with a regional CM of a desired sponsor and/or a product made specifically for the area where terminal is located (i.e., the area where a user of the terminal lives), and provided to users all over the country.

In this embodiment, the tag information is exemplarily a "sponsor" code or a "product" code. However, this is not restrictive, and the tag information may be anything as far as interrelating a program to be broadcast and a CM on the network.

For example, in this embodiment, the tag information and the URL table are described as being independent from each other. However, the tag information may be such URL table as shown in FIG. 14. The table in FIG. 14 has URLs for regional CMs. The TV commerce terminal 1 stores the location information, and once a program is received, performs URL specification to a CM made for the area of the terminal 1 by referring to the URL table of FIG. 14 embedded in the program as the tag information, and the location information.

Alternatively, the tag information may be an advertising period table as shown in FIG. 15. In the table in FIG. 15, each advertising period has each different sponsor (e.g., a period from Feb. 1, 2000 to Mar. 1, 2000, a period from Mar. 2, 2000 to Dec. 31, 2000, and the like). Having previously stored the location information and the URL table as shown in FIG. 10, for example, and once a program is received, the TV commerce terminal 1 first selects a sponsor according to the advertisement period table in FIG. 15 which has been embedded in the program as the tag information, and the current time. Thereafter, by referring to the location information and the URL table of FIG. 10, the TV commerce terminal 1 carries out URL specification to a CM of the selected sponsor and targeting the area of the terminal 1. As an example, assuming that today is Feb. 10, 2000, first by referring to the advertisement period table in FIG. 15, the sponsors "A" and "D" are selected as found in the period range of Feb. 1, 2000 to Mar. 1, 2000. Thereafter, by referring to the URL table in FIG. 10, URL specification is carried out with respect to the CMs of the sponsor "A" and "D". As such, by embedding the advertisement period table in the program as the tag information, the CMs to be inserted in the program may vary in sponsor according to the advertisement period (e.g., each different sponsor for Feb. 1, 2000 to Mar. 1, 2000).

The tag information may be a user's watching status table as shown in FIG. 16. The table in FIG. 16 has each different sponsor depending on the user's watching status (e.g., the user watches the program real time, or records the program for later). The TV commerce terminal 1 previously stores the location information and the URL table in FIG. 10, for example. Once received a program, the TV commerce terminal 1 first selects a sponsor based on the user's watching status table in FIG. 16 embedded in the program as the tag information, and the actual user's watching status. Thereafter, based on the location information and the URL table in FIG. 10, the TV commerce terminal 1 performs URL specification to a CM made by the selected sponsor and for the area of the terminal 1. For example, if the user's watching status is "watch real time", based on the user's watching status table in FIG. 16, the applicable sponsors "A" and "D" are selected. Thereafter, based on the URL table in FIG. 10, URL specification is done with respect to the CMs of the sponsors "A" and "D". As such, by embedding the user's watching status table in the program, the CMs varied in sponsor can be inserted depending on how the program is watched by the user (e.g., watched real time, or recorded for later).

In this embodiment, the tag information has the "sponsor" code or "product" code. Thus, in the case that the TV commerce system in FIG. 1 is additionally provided with the name server 7, the TV commerce terminal 1 gives the "sponsor" code or "product" code on the tag information, and the location information to the name server 7, and then brings the name server 7 to perform CM selection and URL specification. Alternatively, instead of the "sponsor" code or the "product" code for CM selection, a "program" ID specifying the program (to be embedded with the information) may be added to the tag information. If this is the case, the TV commerce terminal 1 informs the "program ID" on the tag information to the name server 7. The name server 7 then responds, back to the terminal 1, the applicable URL (or the URL table) of the CM made by the sponsor corresponding to the informed ID.

As is known from the above, by the tag information having the "program ID", and by the TV commerce terminal 1 informing the name server 7 of the "program ID" and receiving the applicable URL of the CM made by the sponsor of the program from the name server 7, the sponsor (of the program) can change the interrelationship between the program and the CM through the name server 7. That is, the sponsor can change which CM is to be inserted in the program. For example, the sponsor may previously determine, for each CM, how many times the CM to be fetched. When a certain CM is fetched for the determined number of times (in other words, when the name server 7 informs the URL address of a certain CM back to the terminal 1 for the determined number of times), the name server 7 starts informing another CM's URL back to the terminal 1.

While the invention has been described in detail, the foregoing description is in all aspects illustrative and not restrictive. It is understood that numerous other modifications and variations can be devised without departing from the scope of the invention.

What is claimed is:

1. A terminal for receiving and outputting a transmitted video content, said terminal comprising:
   a reception unit operable to receive the video content containing tag information which corresponds to the video content, which is used to select a plurality of CMs, and which indicates a correspondence between the video content and the plurality of CMs, which are each assigned a URL;
   a URL specifying unit operable to specify the URL assigned to at least one of the plurality of CMs based on location information indicating an area where said terminal is located and the tag information, with reference to CM specifying information indicating a correspondence between the location information and the tag information;
   a fetch unit operable to fetch the at least one of the plurality of CMs by using the URL specified by said URL specifying unit; and
   an output unit operable to output the video content and the at least one of the plurality of CMs which corresponds to the video content, wherein:
   at least a portion of the video content is scrambled;
   the at least one of the plurality of CMs is embedded with key information for descrambling the video content; and
   said output unit is operable to extract the key information from the at least one of the plurality of CMs fetched by said fetch unit, and descramble the video content by using the key information.

2. The terminal according to claim 1, wherein said URL specifying unit is operable to extract the tag information, from the video content, without descrambling.

3. The terminal according to 1, wherein:
   the at least one of the plurality of CMs is in a form of a MPEG2 video stream;
   the key information is embedded in one of a group-of-picture layer, a picture layer, and a sequence layer in a user data region of the MPEG2 video stream; and
   said output unit is operable to extract the key information from the user data region.

4. The terminal according to claim 1, wherein:
   the at least one of the plurality of CMs is in a form of a MPEG2 video stream;
   the key information is embedded as a digital watermark in the MPEG2 video stream; and
   said output unit is operable to decode the MPEG2 video stream, and extract the key information.

5. The terminal according to claim 1, wherein:
   an output time for each of the plurality of CMs is predetermined; and
   said fetch unit is operable to fetch each of the plurality of CMs before the output time therefor.

6. The terminal according to claim 4, wherein output times for the plurality of CMs are distributed over a time period for outputting the video content.

7. A terminal for receiving and outputting a transmitted video content, said terminal comprising:
   a reception unit operable to receive the video content containing tag information which corresponds to the video content, which is used to select a plurality of CMs, and which indicates a correspondence between the video content and the plurality of CMs, which are each assigned a URL;
   a URL specifying unit operable to specify the URL assigned to at least one of the plurality of CMs based on location information, indicating an area where said terminal is located and the tag information, with reference to CM specifying information indicating a correspondence between the location information and the tag information;
   a fetch unit operable to fetch the at least one of the plurality of CMs by using the URL specified by said URL specifying unit; and
   an output unit operable to output the video content and the at least one of the plurality of CMs which corresponds to the video content, wherein:
   said URL specifying unit is operable to notify the tag information and the location information to a name server, on a network, which stores the CM specifying information, request the name server to specify the URL, and receive the URL specified by the name server;
   at least a portion of the video content is scrambled;
   one of the plurality of CMs is embedded with key information for descrambling the video contnet; and
   said output unit is operable to extract the key information from the at least one of the plurality of CMs fetched by said fetch unit, and descramble the video content by using the key information.

8. The terminal according to 7, wherein said URL specifying unit is operable to extract the tag information, from the video content, without descrambling.

9. The terminal according to 7, wherein:
   the at least one of the plurality of CMs is in a form of a MPEG2 video stream;
   the key information is embedded in one of a group-of picture layer, a picture layer, and a sequence layer in a user data region of the MPEG2 video stream; and
   said output unit is operable to extract the key information from the user data region.

10. The terminal according to claim 7, wherein:
the at least one of the plurality of CMs is in a form of a MPEG2 video stream;
the key information is embedded as a digital watermark in the MPEG2 video stream; and
said output unit is operable to decode the MPEG2 video stream, and extract the key information.

11. The terminal according to claim 7, wherein:
an output time for each of the plurality of CMs is predetermined; and
said fetch unit is operable to fetch each of the plurality of CMs before the output time therefor.

12. The terminal according to claim 11, wherein output times for the plurality of CMs are distributed over a time period for outputting the video content.

13. A content providing system for providing a video content and one of a plurality of CMs corresponding to the video content, said content providing system comprising:
a transmitting device for transmitting the video content containing tag information including information of the video content;
a storage device for storing the plurality of CMs, which are each respectively assigned a URL; and
a terminal for specifying the plurality of CMs each being assigned the respective URL, establishing a correspondence between the video content and the plurality of CMs, and outputting the video content containing the tag information corresponding to the video content and the plurality of CMs corresponding to the video content, wherein:
said terminal is operable to specify the respective URL of one of the plurality of CMs with reference to CM specifying information indicating a correspondence between location information and the tag information;
at least a portion of the video content is scrambled;
the at least one of the plurality of CMs corresponding to the video content is embedded with key information for descrambling; and
said content providing system is operable to descramble the video content by using the key information extracted from the at least one of the plurality of CMs for outputting.

14. The content providing system according to claim 13, wherein:
the at least one of the plurality of CMs is in a form of a MPEG2 video stream; and
said terminal is operable to extract the key information embedded in one of a group-of-picture layer, a picture layer, and a sequence layer in a user data region of the MPEG2 video stream, and output the video content and the at least one of the plurality of CMs corresponding to the video content.

15. The content providing system according to claim 13, wherein:
the at least one of the plurality of CMs is in a form of a MPEG2 video stream; and
said terminal is operable to decode and extract the key information embedded as a digital watermark in the MPEG2 video stream, and output the video content and the at least one of the plurality of CMs corresponding to the video content.

* * * * *

UNITED STATES PATENT AND TRADEMARK OFFICE
CERTIFICATE OF CORRECTION

| | |
|---|---|
| PATENT NO. | : 7,146,631 B1 |
| APPLICATION NO. | : 09/706753 |
| DATED | : December 5, 2006 |
| INVENTOR(S) | : Tsutomu Tanaka et al. |

It is certified that error appears in the above-identified patent and that said Letters Patent is hereby corrected as shown below:

On the Title Page
In Section (30), Foreign Application Priority Data, change "11/316719" to --316719/1999--.

Claim 7
In column 16, line 31, change "information, indicating" to --information indicating--.

Signed and Sealed this

Twenty-seventh Day of March, 2007

JON W. DUDAS
*Director of the United States Patent and Trademark Office*